(12) United States Patent
Lenny et al.

(10) Patent No.: US 6,600,614 B2
(45) Date of Patent: Jul. 29, 2003

(54) CRITICAL EVENT LOG FOR A DISC DRIVE

(75) Inventors: Thomas R. Lenny, Longmont, CO (US); James Arthur Herbst, Longmont, CO (US); Jonathan William Haines, Lafayette, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/891,988

(22) Filed: Jun. 25, 2001

(65) Prior Publication Data

US 2002/0060868 A1 May 23, 2002

Related U.S. Application Data

(60) Provisional application No. 60/236,316, filed on Sep. 28, 2000.

(51) Int. Cl.[7] .................... G11B 27/36; G11B 5/09; G06F 17/40
(52) U.S. Cl. .................... 360/31; 360/53; 702/185; 702/186; 702/187; 714/42; 714/718; 714/723
(58) Field of Search .................... 360/31, 53, 25; 714/42–45, 56–57, 723, 54, 718, 721, 41, 719; 702/182–183, 185–187

(56) References Cited

U.S. PATENT DOCUMENTS

| | | | |
|---|---|---|---|
| 4,348,624 A | 9/1982 | Anderson et al. | 318/634 |
| 4,498,146 A * | 2/1985 | Martinez | 711/115 |
| 4,578,721 A | 3/1986 | Brannan et al. | 360/51 |
| 4,888,691 A | 12/1989 | George et al. | 364/300 |
| 5,422,890 A * | 6/1995 | Klingsporn et al. | 714/723 |
| 5,539,592 A | 7/1996 | Banks et al. | 360/75 |
| 5,568,627 A | 10/1996 | Leshay et al. | 395/439 |
| 5,654,841 A | 8/1997 | Hobson et al. | 360/75 |
| 5,661,615 A | 8/1997 | Waugh et al. | 360/75 |
| 5,828,538 A | 10/1998 | Apland et al. | 361/56 |
| 5,828,583 A * | 10/1998 | Bush et al. | 702/185 |
| 5,909,334 A | 6/1999 | Barr et al. | 360/53 |
| 5,914,967 A * | 6/1999 | Yomtoubian | 714/718 |
| 6,088,662 A | 7/2000 | Flinsbaugh et al. | 702/132 |
| 6,204,660 B1 | 3/2001 | Lee | 324/212 |
| 6,408,406 B1 * | 6/2002 | Parris | 714/41 |
| 6,493,656 B1 | 12/2002 | Houston et al. | 702/187 |

* cited by examiner

Primary Examiner—David Hudspeth
Assistant Examiner—Dan I. Davidson
(74) Attorney, Agent, or Firm—Merchant & Gould P.C.

(57) ABSTRACT

An apparatus, modules, means, and computer readable media for and a method of logging critical events to a critical event log storage area on a disc in a disc drive are disclosed. The disc drive having a data storage disc is operably connected to a host computer. The data communication between the host computer and the disc drive is established via a disc drive interface. The disc drive interface may be an ATA disc drive interface. A power-on operational status of the disc drive with the host computer is determined. Then a critical event is determined without a host computer intervention. A set of critical events are predefined and stored in the firmware of the disc drive. The critical event can be monitored and logged either during an on-line data collection mode or an off-line data collection mode. During the off-line data collection mode, the firmware performs off-line scan of the disc drive in the background. The determined critical event is logged to the critical event log by reading the critical event log from the critical event log storage area on the disc; appending the determined critical event to the critical event log; and storing the appended critical event log to the critical event log storage area on the disc.

26 Claims, 3 Drawing Sheets

CRITICAL EVENT LOG FOR A DISC DRIVE

RELATED APPLICATIONS

This application claims priority of U.S. provisional application Serail No. 60/236,316, filed Sep. 28, 2000 and titled "CRITICAL EVENT LOG FOR HARD DISK DRIVES".

FIELD OF THE INVENTION

This application relates generally to critical event logging techniques and the critical events that are useful for performing disc drive failure analysis in real time without a host computer intervention, and more particularly critical events are disc drive operational events, errors, and other information that are useful for disc drive failure analysis.

BACKGROUND OF THE INVENTION

Disc drives are data storage devices that store digital data in magnetic form on a rotating storage medium called a disc. Modem disc drives comprise one or more rigid discs that are coated with a magnetizable medium and mounted on the hub of a spindle motor for rotation at a constant high speed. Each surface of a disc is divided into several thousand tracks that are tightly-packed concentric circles similar in layout to the annual growth rings of a tree. The tracks are typically numbered starting from zero at the track located outermost the disc and increasing for tracks located closer to the center of the disc. Each track is further broken down into sectors and servo bursts. A sector is normally the smallest individually addressable unit of information stored in a disc drive and typically holds 512 bytes of information plus a few additional bytes for internal drive control and error detection and correction. This organization of data allows for easy access to any part of the discs. A servo burst is a particular magnetic signature on a track, which facilitates positioning of heads over tracks.

Generally, each of the multiple discs in a disc drive has associated with it two heads (one adjacent the top surface of the disc, and another adjacent the bottom) for reading and writing data to a sector. A typical disc drive has two or three discs. This usually means there are four or six heads in a disc drive carried by a set of actuator arms. Data is accessed by moving the heads from the inner to outer part of the disc (and vice-versa) driven by an actuator assembly. The heads that access sectors on discs are locked together on the actuator assembly. For this reason, all the heads move in and out together and are always physically located at the same track number (e.g., it is impossible to have one head at track 0 and another at track 500). Because all the heads move together, each of the tracks on all discs is known as a cylinder for reasons that these tracks form a cylinder since they are equal-sized circles stacked one on top of the other in space. So, for example, if a disc drive has four discs, it would normally have eight heads, and a cylinder number 680 would be made up of a set of eight tracks, one per disc surface, at track number 680. Thus, for most purposes, there is not much difference between tracks and cylinders since a cylinder is basically a set of all tracks whereat all the heads are currently located.

As with any data storage and retrieval, data integrity is critical. Oftentimes, for various reasons such as defective media, improper head positioning, extraneous particles between the head and media, or marginally functioning components, disc drives may record or read data incorrectly to or from the disc. For reasons such as predicting imminent disc drive failure, disc drive testing, and evolutionary disc drive improvement, it is valuable to characterize a disc drive's operating parameters; it is particularly useful to characterize unsuccessful reads and writes.

Disc drives will inevitably fail at the end of a long period of normal operations. As a result, the associated PC system will be down while the disc drive is replaced. Additionally, the disc drive failure may cause the loss of some or all of the data stored in the disc drive. While much of the data stored in the failed disc drive may be recoverable, the recovery of such data may be both costly and time consuming.

Disc drives may fail suddenly and unpredictably during a normal operation or may fail due to gradual decay of disc drive components after a long period of normal operations. To this end, the industry recognized Self Monitoring Analysis & Reporting Technology (SMART) feature was developed. SMART is an effective tool for predicting the disc drive failure due to gradual decay of the disc drive components. SMART is essentially a self-contained disc drive monitoring system that measures, records, and analyzes various operating metrics of a disc drive. Most of SMART feature resides in a disc drive firmware. In order to access data collected by SMART, the host executes command data set defined by the disc drive interface standard such as Advanced Technology Attachment (ATA) interface standard, which is also known as Integrated Device Electronics (IDE) interface.

The host computer, however, does perform a lot of interpretation of data collected by SMART. That is, the host may perform simple operations such as retrieve SMART data and perform simple comparisons, but almost all of the brain power that maintains, updates, SMART feature is in the disc drive firmware and the controller themselves.

SMART was initially designed and developed primarily for predicting disc drive failures. As a result, the data collected by SMART was inadequate to conduct a successful disc drive failure analysis. SMART was focused on predicting disc drive failures and collecting relevant information prior to a disc drive failure. More specifically, the data collected by SMART did not contain enough details needed for conducting a successful failure analysis. The data collected by SMART was inadequate for analyzing the root cause of the failure for an already failed disc drive. That is, SMART data did not provide a complete history of important disc drive operational events while the disc drive was in normal operation with the host computer. By understanding a history of the failed disc drive operations, the failure analysis can be performed more quickly and efficiently.

Accordingly there is a need for techniques that allows a disc drive to log critical events that are useful for conducting a failure analysis of the disc drive. The critical events are interesting disc drive operational events, errors, and other information that can show the operational history of the disc drive operations prior to the failure.

SUMMARY OF THE INVENTION

Against this backdrop an embodiment of the present invention has been developed. An embodiment of the invention described monitors and logs critical events to a critical event log stored in a critical event log storage area on a disc in a disc drive. The disc drive having a data storage disc is operably connectable to a host computer. The data communication between the host computer and the disc drive is established via a disc drive interface. The disc drive interface may be an ATA disc drive interface. A portion of the data storage disc is a critical event log storage area. A power-on operational status of the disc drive with the host computer is determined. Then a critical event is determined without a host computer intervention. The critical event is predefined information related to disc drive operation. The list of the critical events and the programming for the critical event logging are stored in the firmware of the disc drive. The determined critical event occurrence is stored on the critical event log storage area on the disc. The critical event can be monitored and logged either during an on-line data collection mode or an off-line data collection mode. During the off-line data collection mode, the firmware performs off-line scan of the disc drive in the background. The determined critical event occurrence is then logged to the critical event log by reading the critical event log from the critical event log storage area on the disc; appending the determined critical event to the critical event log; and storing the appended critical event log to the critical event log storage area on the disc. These and various other features as well as advantages which characterize the present invention will be apparent from a reading of the following detailed description and a review of the associated drawings.

DETAILED DESCRIPTION

Figure 1:
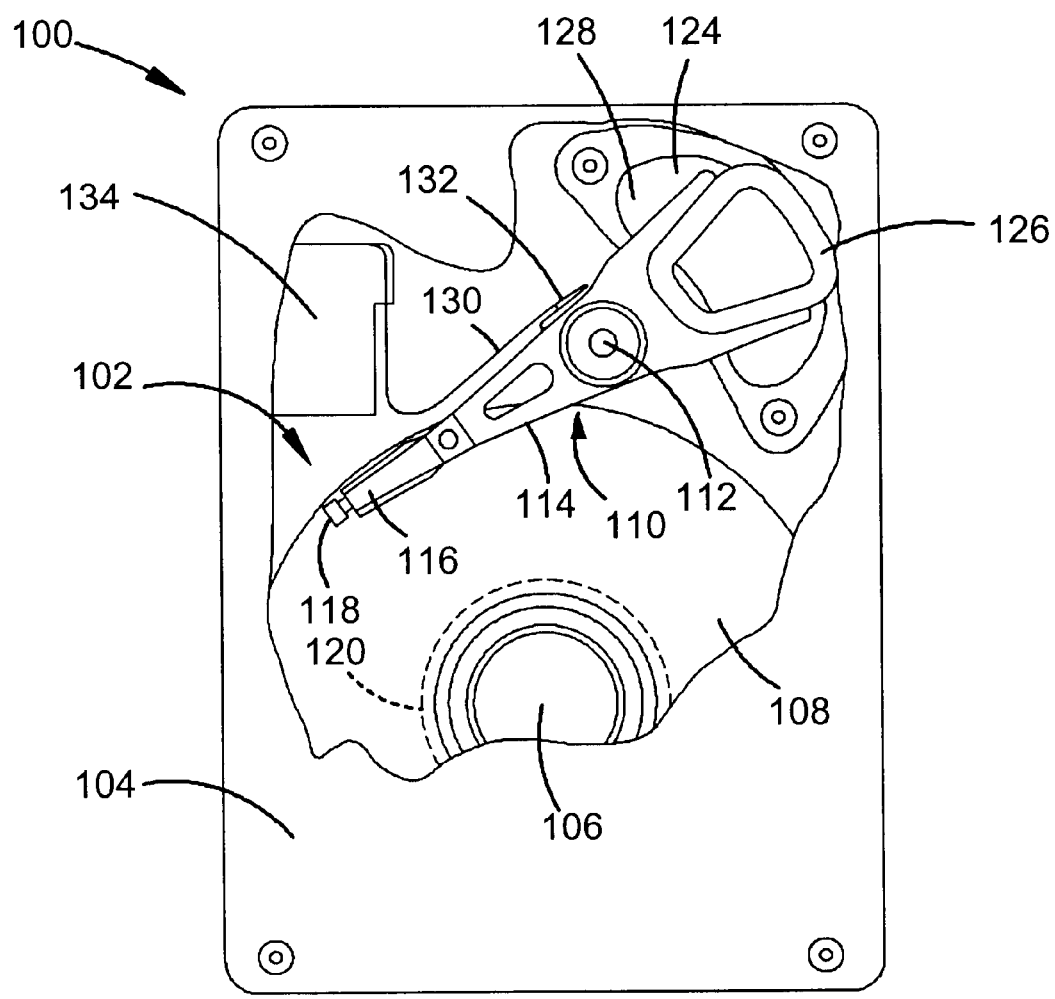
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
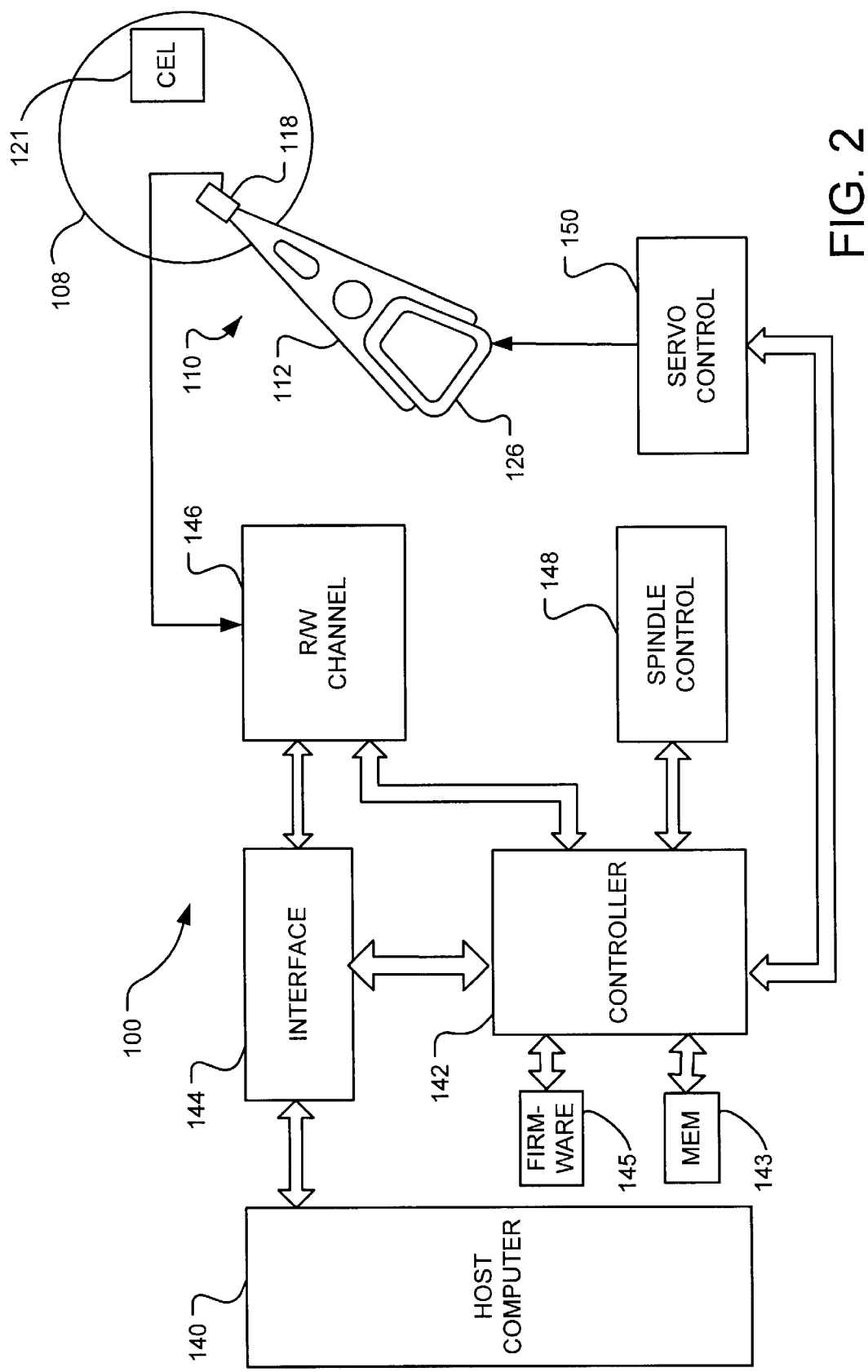
FIG. 2 is a simplified block diagram of a disc drive and its connection to the host computer system including a servo system with which the present invention is particularly useful.

Referring now to FIG. 2, shown therein is a functional block diagram of the disc drive 100 of FIG. 1, generally showing the main functional circuits that are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive controller 142. The controller 142 generally provides top level communication and control for the disc drive 100 in conjunction with programming for the controller 142 stored in a controller memory (MEM) 143 and/or a firmware 145.

The MEM 143 can include random access memory (RAM), read only memory (ROM), and other sources of resident memory for the controller 142. The firmware 145 is a programming module typically included into a ROM 145 that is operably connected to the controller 142. The firmware 145 can be installed in the ROM using a disc drive interface 144, can be distributed like other software modules, and further can be created and tested by using microcode simulation. The firmware 145 is often a key component of the disc drive operation, because it contains the software program for disc drive operations that could be independent from the control of the host 140.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity and acceleration of the head 118, and uses that information in conjunction with a model, stored in memory 143, to communicate with the servo control circuit 150, which will apply a controlled amount of current to the voice coil motor 126, thereby causing the actuator assembly 110 to be pivoted.

Data is transferred between the host computer 140 and the disc drive 100 by way of the disc drive interface 144, which typically includes a buffer to facilitate high speed data transfer between the host computer 140 and the disc drive 100. Data to be written to the disc drive 100 are thus passed from the host computer to the disc drive interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140.

Generally, the disc drive interface 144 is hardware and/or software that regulates transmission of data and manages the exchange of data between the disc drive 100 and the host computer 140. This disc drive interface 144 is contained in the electronics of the disc drive 100. A standard committee such as American National Standard Institute (ANSI) oversees the adoption of an interface protocol by which any peripheral device following the common standard can be used interchangeably. Programming of the firmware 145 follows the disc drive interface protocol.

There are various types of disc drive interface standards such as Small Computer Systems Interface (SCSI), FibreChannel-Arbitrated Loop (FC-AL), Serial Storage Architecture (SSA), Advanced Technology Attachment (ATA), Integrated Device Electronics (IDE), CompactFlash, etc. In an embodiment of the present invention, the ATA interface standard is used as an interface between the host computer 140 and the disc drive 100. However, it is well known to those skilled in the art that the same scope and spirit disclosed in an embodiment of the present invention can also be applied to other types of disc drive interfaces listed above.

The ATA interface is the official ANSI standard designation for the interface between a disc drive and a host computer. Generally, the ATA standard specification deals with the power and data signal interfaces between the motherboard in the host computer and the disc controller in the disc drive. The ATA interface is primarily used in single host computer applications and usually supports one or two disc drives, generally known as a master and slave disc drives (or alternatively disc drives 0 and 1).

The ATA disc drives are known to be quite reliable but they may fail occasionally. A disc drive failure may be costly and time consuming when the associated host computer is also down while the disc drive is being replaced. Since the stored data may be lost unless the disc drive was backed up shortly prior to the disc drive failure, it may also be costly. A disc drive failure however could be predictable or unpredictable. An unpredictable disc drive failure is a sudden, unforeseen failure often due to uncontrollable external circumstances such as a power surge. A predictable disc drive failure is due to normal wear and tear of the electrical and mechanical disc drive components during normal disc drive operations. This means that some attributes of electronic or mechanical components can be monitored and that a predictive failure analysis is thus possible. Generally, mechanical component failures are predictable and account for sixty percent of all types of drive failures although certain electronic component show signs of degradation before failing. For example, monitoring the degradation of head flying height may detect a potential head crash.

In order to prevent such loss of time or data due to a disc drive failure, a new reliability prediction technology known as SMART was developed. SMART is a reliability prediction technology for predicting or anticipating a failure for disc drives generally operating under both ATA/IDE and SCSI environments. SMART, for example, upon anticipating a disc drive failure, would provide a sufficient notice that allows a user to schedule replacement of a worn-out disc drive or that allows a user or a system to backup data. SMART technology, originally pioneered by Compaq Computers, is under continued development by the top disc drive manufacturers in the world.

SMART monitors a series of attributes that are indicators of an electronic or mechanical component failure. These attributes are chosen specifically for each individual disc drive model, because drive architectures vary from one model to another. That is, attributes and thresholds that may be a failure indicator for one disc drive model type may not be true for another model type. SMART cannot predict all possible disc drive failures, but SMART is an evolving technology that helps to improve the ability to predict reliability of disc drives. Thus, subsequent changes to SMART attributes and threshold can be made based on various field experiences.

SMART generates alarm signals (e.g., in response to SMART "report status" command), and the software on the host computer 140 interprets the alarm signals. The host computer polls the disc drive on a regular basis to check the status of this "report status" command, and if the command signals imminent failure, the host computer sends an alarm to the end user or the system administrator. This allows scheduling of a downtime for backup of data and replacement of the disc drive.

Most of the programming for the SMART technology resides in the disc drive firmware 145. In order to access the data in the firmware 145 collected by SMART, an engineer uses a set of the ATA commands since the disc drive and the host computer are operably connected by the ATA disc drive interface. The disc drive firmware 145 and/or controller 142 perform most operations for collection and processing of SMART data and post the result to the host computer 140 indicating whether a disc drive failure is imminent.

SMART—a technology developed primarily for predicting disc drive failures—has undergone vast improvements since the inception. For example, SMART Error Logging is an extension of SMART for reporting a record of the most recent errors reported by the disc drive 100 to the host computer 140. An error arises when the disc drive 100 fails to perform a command (e.g., a read or write command) issued by the host computer 140. Such an error is then recorded by SMART Error Logging technology.

Whereas SMART was developed for predicting disc drive failures while the disc drive 100 is in operation with the host computer 140, a Drive Self-Test (DST) was developed for diagnosing root causes of disc drive failures or suspected disc drive problems for a failed disc drive. For example, upwards of forty-percent of all supposedly failed disc drives returned to a disc drive manufacturer such as Seagate are tested with the DST and are determined to be fully operational disc drives. The DST tests the operational status of the reportedly failed disc drive and determines whether there have been some other causes for the disc drive return, such as a virus infection or a software bug. The DST is stored as a part of the firmware 145 of the disc drive 100. Generally, an engineer would run the DST of the returned disc drive and would have the firmware 145 post the result to the host as to whether or not the disc drive has actually failed.

There are two types of the DST: DST Quick Test and DST Enhanced Test. The DST Quick Test is a two-minute test targeted at quickly determining the operational status of the drive. As a part of the test, the DST Quick Test reads at least the first 1.5 gigabytes of the disc drive. Unlike the DST Quick Test, the DST Enhanced Test completely scans the disc drive media. The time required to complete the DST Enhanced Test depends on the capacity of the disc drive, but it is considerably longer that the time required to complete the DST Quick Test.

SMART was developed as a tool for predicting a disc drive failure by collecting the disc drive attributes and analyzing them while the disc drive is in normal use. However, the data collected by SMART is inadequate for analyzing root causes of the failed disc drive. Because SMART was so focused on predicting a disc drive failure, the data collected by SMART did not contain other related useful information that may be useful for analyzing the disc drive failure. More specifically, the data related to the attributes collected by SMART did not contain enough details needed for conducting a successful failure analysis, although the collected data may be adequate for failure prediction. Further, some attributes important for a failure analysis were not recorded by SMART if those attributes were not useful for failure prediction.

For example, SMART for predicting a disc drive failure may typically record the frequency and severity of the following attributes as indicators for disc drive reliability (although the attributes are disc drive specific): head flying height, data throughput performance, spin-up time, reallocated sector count, seek error rate, seek time performance, spin retry count, drive calibration retry count, etc. The frequency and severity of occurrences of these attributes are important criteria for determining a disc drive failure. However, for analyzing a root cause of a disc drive failure, an engineer conducting the failure analysis would require information that shows what happened to the disc drive while the disc drive was in normal operation. A time stamp for each occurrence of event, for example, would be a great tool for understanding the past of the failed disc drive. To illustrate, SMART may record the frequency of one attribute, the reallocated sector count (e.g., the sector with a particular physical cylinder head sector (PCHS) address were reallocated ten times prior to the disc drive failure), but captures inadequate information as to when each sector reallocation occurred (e.g., all ten sector reallocations occurred within ten seconds of each other as opposed to each of the ten sector reallocations occurred on the midnight of every tenth day from the previous sector reallocation). By analyzing the history of the disc drive in detail, the cause of the disc drive failure may be determined. Further, the analysis may reveal that the returned disc drive was mislabeled and that the perceived disc drive failure was caused by external devices outside the disc drive. Nevertheless, SMART did not provide enough details for the information that is useful for understanding the pathology of the failed disc drive. Moreover, SMART may not record many types of events or errors unless each occurrence exceeds the established minimum threshold. Thus, there may have been many unrecorded notable occurrences useful for failure analysis because all fell short of SMART threshold.

Further, SMART does not record many events that may not be useful for failure prediction but may be useful for failure analysis. For example, an event such as changing the disc drive setting from master to slave (or 0 to 1) would not be captured by SMART since such an event has no bearing on determining the reliability of a disc drive or predicting a disc drive failure. An event is a disc drive operational occurrence that falls short of being an error (e.g., a successful sector reallocation). An error on the other hand arises when the disc drive could not successfully carry out a command issued by a host computer (e.g., a failure to write to a sector due to a failed sector reallocation).

Furthermore, the DST would not provide a complete pathology of the failed disc drive although it provides information as to whether the disc drive is a good or failed drive. Running the Enhanced DST takes a long period of time since the entire disc drive media was tested since no information was logged while the disc drive was in operation. Running the Quick DST may require less time, but the test result provides high number of false negatives (i.e., good drives indicated as bad drives).

Therefore, since knowing the history of the disc drive before the failure is important for conducting a failure analysis and since running the DST on a failed disc drive is too time consuming and provides insufficient information, a Critical Event Log 121 and operations to determine the Critical Event Log is disclosed in an embodiment of the present invention. The Critical Event Log 121 contains historical information of the disc drive. All events, errors, and/or any disc drive operational information that are useful for failure analysis of a disc drive are stored in the Critical Event Log 121. The Critical Event Log 121 is stored in the dedicated sectors on the disc 108 inside the disc drive 100. The Critical Event Log 121 is updated in real time, and the logging operation is independent of the control of the host computer. The Critical Event Logging operations are transparent to a user. The information stored in the Critical Event Log 121 is mainly for an engineer conducting a disc drive failure analysis, and without the Critical Event Log 121 information, the engineer would have very little idea as to what environment the disc drive was in before the failure. The engineer can access the Critical Event Log 121, by using the access commands that meets the ATA interface protocol. Relying on SMART data alone to determine the cause of failure may require a lot of guessing work. The Critical Event Log allows the engineers to obtain a report of each disc drive. The report would show what happened to the disc drive prior to the failure.

TABLE 1

| Hours | Time Stamp | LBA | R-Theta-Z | Error Code | Type |
| --- | --- | --- | --- | --- | --- |
| 23 | 3340f9ad | 5dbff6 | 1ce4-36d8-0 | Rd-UnRec | Scan |
| 23 | 33490856 | 12a53bf | 5d7d-e97-0 | Rd-UnRec | Scan |
| 24 | 3e2524a8 | 12a53bf | 5d7d-e97-0 | Rd-UnRec | Verify |

Shown in Table 1 is an example of the information stored in the Critical Event Log. Each row represents an entry to the Critical Event Log. For example, the first entry indicates that a read operation to the sector having an LBA of 5dbff6 (HEX) and located at the R-Theta-Z of 1ce4(HEX)-36d8 (HEX)-0(HEX) was not successful at the $23^{rd}$ hour and 3340f9ad (HEX) microseconds.

Further shown in Table 2 below is the organization of a sector that holds Critical Event Log information. Each sector of the Critical Event Log 121 can hold up to fifteen entries as shown by the rows 6–17. The rows 1–5 store information pertaining to the starting number and the time stamp of the first entry of the fifteen entries. The meaning of the Descriptions in the Table 2 are generally well known to and understood by those skilled in the art.

TABLE 2

| Row | Byte | Descriptions |
| --- | --- | --- |
| 1 | 0–1 | Index Number of the Starting Log Entry of This Sector |
| 2 | 2–3 | Reserved |
| 3 | 4–7 | Last Critical Event Time Stamp (Hours) |
| 4 | 8–11 | Last Critical Event Time Stamp (Microseconds) |
| 5 | 12–31 | Reserved |
| 6 | 32–511 | 15 entries of 32 bytes each as described below (n = 1 thru 15) |

TABLE 2-continued

| Row | Byte | Descriptions |
|---|---|---|
| 7 | n*32 | Type of event (see the Entry Number in Table 3) (2 Bytes) |
| 8 | n*32 + 2 | Time Stamp of event in Hours (2 Bytes) |
| 9 | n*32 + 4 | Time Stamp of event (4 Bytes) |
| 10 | n*32 + 8 | LBA (4 Bytes) |
| 11 | N*32 + 12 | Error Code |
| 12 | N*32 + 13 | Raw Temperature at time of error |
| 13 | N*32 + 14 | Reserved |
| 14 | N*32 + 15 | Reserved |
| 15 | n*32 + 16 | Radius (R-Theta-Z format) of Event |
| 16 | n*32 + 18 | Theta of Event |
| 17 | n*32 + 20 | Z (Head of Event) |

Figure 3:
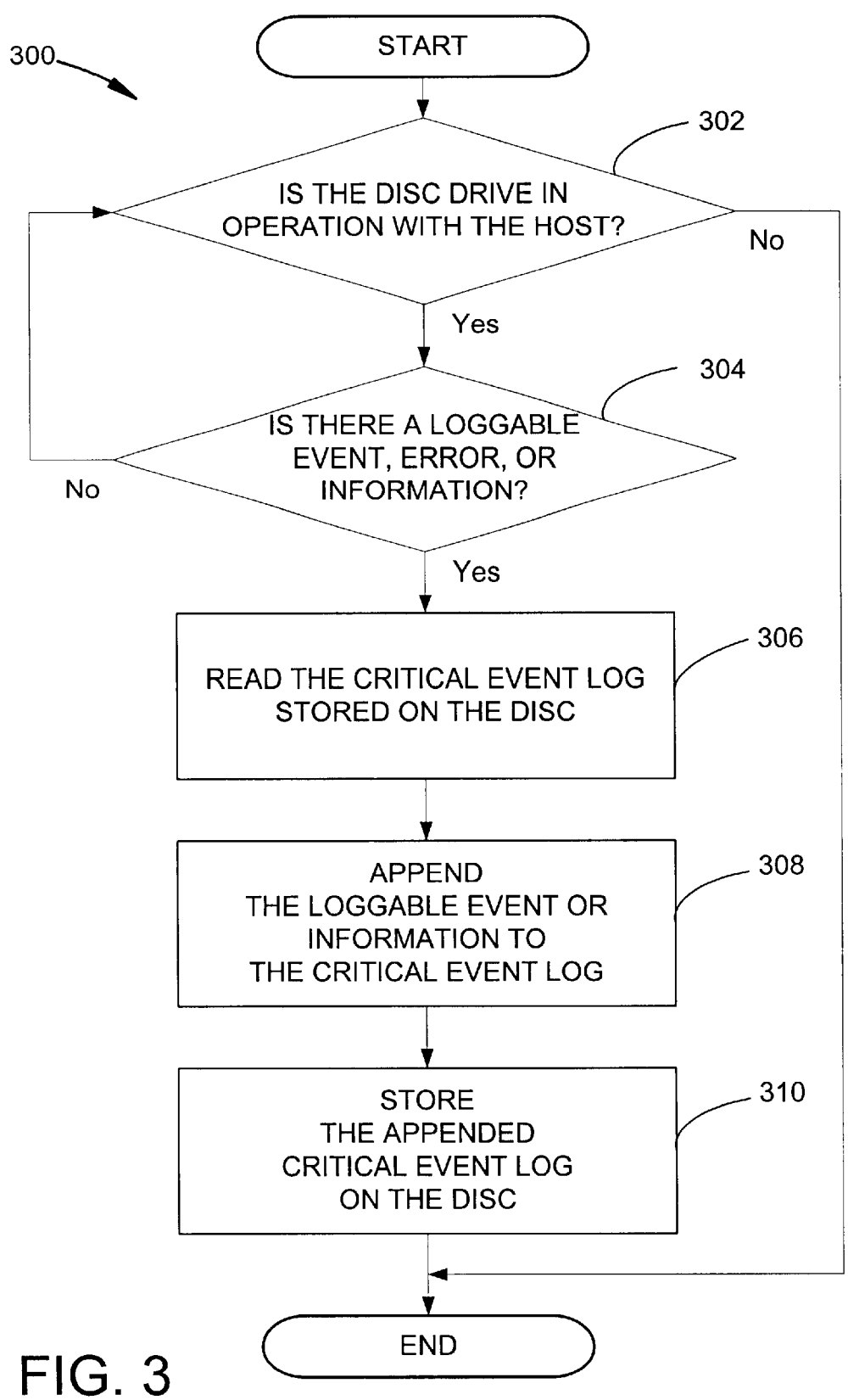
FIG. 3 is a critical event logging flow chart in accordance with a preferred embodiment of the present invention.

Shown in FIG. 3 is a flowchart for the Critical Event Log operations in accordance with an embodiment of the present invention. The firmware 145 contains the programming for the Critical Event Logging operations. In operation 302, the firmware 145 or the controller 142 checks to see whether the disc drive 100 is in operation with the host computer 140. Essentially, the disc drive 100 is in operation with the host computer 140 as soon as the host computer 140 is powered up and the host computer 140 is able to access the disc drive 100 via the ATA interface 144. Furthermore, in operation 302, an on-line or off-line data collection mode is determined. The on-line data collection mode arises when the disc drive is on line with the host computer 140 which issued commands to the disc drive 100. The off-line data collection mode is determined by the firmware 145 upon detecting a certain period of host computer 140 inactivity with respect to the disc drive 100. Once the off-line data collection mode is determined, the firmware 145 may perform various disc drive diagnostics or other related operations without host computer intervention. The off-line data collection mode ends and the on-line data collection mode starts whenever a command is issued by the host computer 140 to the disc drive 100 during the off-line data collection mode. In operation 304, the firmware 145 checks to see whether a loggable event or error has occurred. The list of possible critical event types is shown and described with respect to Table 3. It should be understood that the entries on the list are not to be conveyed as comprehensive. That is, the information recorded in the Critical Event Log can be an event, error, or any disc drive operational information that is useful for understanding the history of the disc drive and for conducting a failure analysis whether or not such an event, error, or other information appears on Table 3 shown below. The meaning of the Descriptions in the Table 3 are generally well known to and understood by those skilled in the art.

TABLE 3

| Event Type | Description |
|---|---|
| | The following entries 0 to F (Hex) are logged during an on-line disc drive operation with the host computer |
| 0 | Bad Write Detected - Recovered |
| 1 | Bad Write Detected - Unrecovered |
| 2 | Bad Write due to Ultra DMA detected failure |
| 3 | Bad Write due to ID not found |
| 4 | Bad Read with normal retries, Exhaustive Retries Recovered Data |
| 5 | Bad Read with normal retries, Data not recovered |
| 6 | Failed to Spare a Bad Sector |
| 7 | SMART threshold exceeded (indicates that a disc drive failure is imminent) |
| 8-F | Reserved |
| | The following entries 10 to 1F (Hex) are logged during the Read of Recent Writes (SWAT) |
| 10 | Bad Write Detected - Recovered |
| 11 | Bad Write Detected - Unrecovered |
| 12 | Bad Write due to Ultra DMA detected failure |
| 13 | Bad Write due to ID not found |
| 14 | Bad Read with normal retries, Exhaustive Retries Recovered Data |
| 15 | Bad Read with normal retries, Data not recovered |
| 16 | Failed to Spare a Bad Sector |
| 17 | SMART threshold exceeded (indicates that a disc drive failure is imminent) |
| 18-1F | Reserved |
| | The following entries are logged during Offline Scan |
| 20 | Bad Write Detected - Recovered |
| 21 | Bad Write Detected - Unrecovered |
| 22 | Bad Write due to Ultra DMA detected failure |
| 23 | Bad Write due to ID not found |
| 24 | Bad Read with normal retries, Exhaustive Retries Recovered Data |
| 25 | Bad Read with normal retries, Data not recovered |
| 26 | Failed to Spare a Bad Sector |
| 27 | SMART threshold exceeded (indicates that a disc drive failure is imminent) |
| 30-3F | Reserved for U-Series specific errors |
| 40-4F | Reserved for Mobile specific errors |

In particular, the firmware 145 can perform the Critical Event Logging operations during the on-line disc drive operations with the host computer 140, during Self-contained Disc Drive Write Authentication Test (SWAT), or Offline Scan. The disc drive 100 is on-line with the host computer 145 whenever the host computer 145 accesses the disc drive 100 or has control over the disc drive 100. A notable example of the on-line operation would be the host computer 145 sending a read or write command to the disc drive 100. The SWAT is a system that essentially checks the integrity of the data written to the disc whether the data is in fact written correctly and in the correct location on the disc and store resultant read metrics for future testing and diagnosing of the disc drive 100. The result of the SWAT is also recorded in the Critical Event Log. Further, the firmware 145 can initiate and perform the Critical Event Logging operations during off-line mode with the host computer 140.

In addition to those listed in the Table 3, an Error Retry Recovery Level may be an interesting entry to be logged in the Critical Event Log 121. The Error Retry Recovery Level measures the level of retries made by the disc drive in order to access a sector on the disc. The Configuration Page of the disc drive may be useful information for logging in the Critical Event Log 121. Jumper setting for master or slave disc drive may be another desirable entry for logging in the Critical Event Log 121. Code Update Revision Number indicating the firmware microcode update may be another useful entry for logging in the Critical Event Log 121.

The set of the Critical Event Log entries as shown in Table 3 and above are one example used in an embodiment of the present invention. The entries may vary depending on the type of the disc drive or the customer requirement. The information in the Critical Events Log 121 is updated in real time without a host computer intervention. If the firmware 145 detects any one of the entries in the Critical Error Log as the one shown in Table 3, the firmware 145 will log that entry to the Critical Event Log by the operations 306–310. In operation 306, the firmware 145 or the controller 142 reads the Critical Event Log 121 stored on the disc 108. The firmware 145 then appends the Critical Event Log entry as described above with respect to Tables 1–3. The appended Critical Event Log is then stored back on the disc 108.

In summary, an embodiment of the present invention may be viewed as a method of logging critical events on the disc (such as 300). A disc drive (such as 100) is operably connectable to a host computer (such as 140). The disc drive (such as 100) has a data storage disc (such as 108), and a portion of the data storage disc is a critical event log storage area (such as 121). The critical event logging method involves determining a power-on operational status of the disc drive with the host computer (such as 302); determining an occurrence of a critical event without a host computer intervention (such as 304), where the critical event is a predefined information related to disc drive operations (such as Table 3); and logging the determined critical event to the critical event log storage area on the disc (such as 306–310). The power-on operation of the disc drive with the host computer is determined based on whether the data communication path between the host computer and the disc drive is established via a disc drive interface. The disc drive interface may be an ATA disc drive interface. A set of the critical events is predefined and stored in the firmware of the disc drive (such as 145 and Table 3).

The critical event logging method further involves determining an on-line data collection mode or an off-line data collection mode and monitoring for occurrence of one of the predefined critical events (such as 302). If the off-line data collection mode is detected, an off-line scan of the disc drive is performed and an occurrence of one of the predefined critical events is monitored (such as 302).

The determined critical event is then logged to the critical event log on the disc by performing the following steps (such as 300): first, the critical event log is read from the critical event log storage area on the disc (such as 306); second, the determined critical event is appended to the read critical event log (such as 308); and third, the appended critical event log is stored in the critical event log storage area on the disc (such as 310).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. In a disc drive operably connectable to a host computer wherein the disc drive has a data storage disc and a portion of the data storage disc is a critical event log storage area, a method of logging critical events comprising steps of:
 (a) determining a power-on operational status of the disc drive with the host computer;
 (b) determining an occurrence of a critical event without a host computer intervention, wherein critical event, include predefined information in addition to error event occurrences related to disc drive operations stored in the firmware of the disc drive; and
 (c) logging the determined critical event to the critical event log storage area on the disc.

2. The method according to claim 1, wherein the power-on operation determining step (a) comprises a step of:
 (a)(i) determining whether a data communication path between the host computer and the disc drive is established via a disc drive interface.

3. The method according to claim 2, wherein the disc drive interface in the data communication determining step (a)(i) is an ATA disc drive interface.

4. The method according to claim 2, wherein a set of the critical events is predefined and stored in the firmware of the disc drive.

5. The method according to claim 4, wherein the critical event determining step (b) further comprises steps of:
 (b)(ii) determining an on-line data collection mode; and
 (b)(iii) monitoring for occurrence of one of the predefined critical events.

6. The method according to claim 5, wherein the determined critical event logging step (c) comprises steps of:
 (c)(i) reading a critical event log from the critical event log storage area on the disc;
 (c)(ii) appending the determined critical event to the read critical event log; and
 (c)(iii) storing the appended critical event log to the critical event log storage area on the disc.

7. The method according to claim 4, wherein the critical event determining step (b) further comprises steps of:
 (b)(iv) monitoring for an off-line data collection mode;
 (b)(v) performing an off-line scan of the disc drive upon detecting the off-line data collection mode; and
 (b)(vi) monitoring for occurrence of one of the predefined critical events.

8. The method according to claim 7, wherein the determined critical event logging step (c) comprises steps of:
 (c)(i) reading a critical event log from the critical event log storage area on the disc;
 (c)(ii) appending the determined critical event to the critical event log; and
 (c)(iii) storing the appended critical event log to the critical event log storage area on the disc.

9. A computer readable media product readable by a host computer and encoding instructions for executing a method of logging a critical event in a disc drive comprising steps of:
 (a) determining a power-on operational status of the disc drive with the host computer;
 (b) determining an occurrence of a critical event without a host computer intervention, wherein critical events include predefined information in addition to error occurrences related to disc drive operations stored in firmware in the disc drive; and
 (c) logging the determined critical event to a critical event log storage area on the disc.

10. A disc drive operably connectable to a host computer wherein the disc drive has a data storage disc and a portion of the data storage disc is a critical event log storage area, the disc drive comprising:
 a critical event logging module;
 a disc drive interface providing a data communications path between the disc drive and the host computer; and
 firmware for storing the critical event logging module operably connected to the critical event log storage area and the disc drive interface wherein a set of a critical events in addition to error occurrences is predefined and stored in the firmware.

11. The disc drive of claim 10 wherein the disc drive interface is an ATA disc drive interface.

12. The disc drive of claim 10 wherein the critical event logging module comprises:

a disc drive operational status determination module for determining a power-on operational status of the disc drive with the host computer; and a critical event determination module for determining an occurrence of a critical event without a host computer intervention, wherein the critical event is a predefined information related to disc drive operations, wherein the critical event logging module stores the determined critical event to the critical event log storage area on the disc.

13. The disc drive of claim 12 wherein the disc drive operational status determination module determines whether the data communication between the host computer and the disc drive is established via the disc drive interface.

14. The disc drive of claim 13, wherein the critical event determination module further monitors for occurrence of one of the predefined critical events during an on-line data collection mode.

15. The disc drive of claim 13, wherein the critical event logging module reads a critical event log from the critical event log storage area on the disc; appends the determined critical event to the read critical event log; and stores the appended critical event log to the critical event log storage area on the disc.

16. The disc drive of claim 13, wherein the means for determining a critical event occurrence monitors for an off-line data collection mode, performs an off-line scan of the disc drive upon detecting the off-line data collection mode, and monitors for occurrence of one of the predefined critical events.

17. The disc drive of claim 14, wherein the critical event logging module reads the critical event log from a critical event log storage area on the disc; appends the determined critical event to the read critical event log; and stores the appended critical event log to the critical event log storage area on the disc.

18. A disc drive operably connectable to a host computer wherein the disc drive has a data storage disc and a portion of the data storage disc is a critical event log storage area, the disc drive comprising:

a disc drive interface providing a data communication path between the disc drive and the host computer; and means for logging a critical event in the critical event log storage area on the disc wherein criteria defining the critical event includes events in addition to error occurrences, the criteria being stored in the firmware of the disc drive.

19. The disc drive of claim 18, wherein the disc drive interface is an ATA disc drive interface.

20. The disc drive of claim 18, wherein the means for logging a critical event comprises:

means for determining a disc drive operational status with respect to the host computer;

means for determining a critical event occurrence without host computer intervention, wherein the critical event is predefined information related to disc drive operations; and means for logging a critical event to the critical event log storage area on the disc.

21. The disc drive of claim 20, wherein the means for determining a disc drive operational status determines whether the power to the host computer is on and whether the data communication between the host computer and the disc drive is established via a disc drive interface.

22. The disc drive of claim 21, wherein a set of the critical events is predefined and stored in the firmware of the disc drive.

23. The disc drive of claim 22, wherein the means for determining a critical event occurrence monitors for occurrence of one of the predefined critical events during an on-line data collection mode.

24. The disc drive of claim 22, wherein the means for logging a critical event reads a critical event log from the critical event log storage area on the disc; appends the determined critical event to the read critical event log; and stores the appended critical event log to the critical event log storage area on the disc.

25. The disc drive of claim 22, wherein the means for determining a critical event occurrence monitors for an off-line data collection mode, performs an off-line scan of the disc drive upon detecting the off-line data collection mode, and monitors for occurrence of one of the predefined critical events.

26. The disc drive of claim 23, wherein the means for logging a critical event reads the critical event log from the critical event log storage area on a disc; appends the determined critical event to the read critical event log; and stores the appended critical event log to the critical event log storage area on the disc.

* * * * *